United States Patent [19]

Chaya

[11] Patent Number: 5,594,708
[45] Date of Patent: Jan. 14, 1997

[54] MAGNETOOPTICAL DISC APPARATUS WITH MAGNETIC HEAD

[75] Inventor: Masahiko Chaya, Yokohama, Japan

[73] Assignee: Canon Kabushiki Kaisha, Tokyo, Japan

[21] Appl. No.: 467,395

[22] Filed: Jun. 6, 1995

Related U.S. Application Data

[63] Continuation of Ser. No. 24,950, Mar. 2, 1993, abandoned.

[30] Foreign Application Priority Data

Mar. 6, 1992 [JP] Japan .................... 4-083053

[51] Int. Cl.$^6$ .......................... G11B 11/00; G11B 33/02
[52] U.S. Cl. .......................... 369/13; 369/77.2
[58] Field of Search ............ 369/13, 100, 109, 369/112, 17, 85, 77.1, 77.2, 75.1; 360/103, 104, 105

[56] References Cited

U.S. PATENT DOCUMENTS

| | | |
|---|---|---|
| 5,247,493 | 9/1993 | Kime et al. ............... 360/103 |
| 5,309,421 | 5/1994 | Fujisawa ................ 369/77.1 |

FOREIGN PATENT DOCUMENTS

| | | | |
|---|---|---|---|
| 3-16050 | 1/1991 | Japan | 369/13 |
| 4-53049 | 2/1992 | Japan | 369/13 |
| 473413 | 3/1992 | Japan | 369/13 |
| 5-28576 | 2/1993 | Japan | 369/13 |
| 5-46903 | 2/1993 | Japan | 369/13 |

*Primary Examiner*—Robert S. Tupper
*Assistant Examiner*—Allen Cao
*Attorney, Agent, or Firm*—Fitzpatrick, Cella, Harper & Scinto

[57] ABSTRACT

An information recording/reproducing apparatus for effecting recording of information on and/or reproduction of information from a recording medium by applying a magnetic field modulated according to information while irradiating a light beam to the recording medium by an optical pickup, includes a magnetic head for generating the magnetic field, a floating type slider for supporting the magnetic head, a discriminating device for discriminating a kind of the recording medium, an escaping device, including a driving source, for escaping the magnetic head away from the recording medium in accordance with a discrimination result and a carriage on which the magnetic head, the floating slider and the escaping device are mounted.

8 Claims, 7 Drawing Sheets

MAGNETOOPTICAL DISC APPARATUS WITH MAGNETIC HEAD

This application is a continuation of prior application, Ser. No. 08/024,950 filed Mar. 2, 1993, now abandoned.

BACKGROUND OF THE INVENTION

1. Field of the Invention

The present invention relates to a magnetooptical disc apparatus, which can erase and rewrite information on a disc-shaped magnetooptical recording medium and, more particularly, to a magnetooptical disc apparatus, which can be commonly used for magnetooptical recording media having different formats such as a magnetic field modulation type overwrite-capable magnetooptical recording medium, an optical modulation type magnetooptical recording medium, a ROM disc, or the like.

2. Related Background Art

When magnetooptical recording based on a magnetic field modulation method is to be performed, a magnetic head must be brought to a position close to a disc surface (recording film) of a magnetooptical recording medium in consideration of the relationship between a modulation frequency and a generated magnetic field, like in a case of a conventional induction type magnetic recording disc apparatus. Therefore, it is easiest and most effective to adopt a floating type slider, which utilizes air dynamic pressure effect generated upon rotation of a disc, in the magnetic head of the magnetic field modulation method. In this case, a sliding surface of the slider, and the opposing disc surface preferably has high surface precision and smoothness so as to maintain a stable floating state (a state keeping a predetermined gap).

However, in an optical modulation type (intensity modulation of a laser beam) magnetooptical recording medium or a ROM (a change in reflectance of emboss pits) disc, since no countermeasure taken in the above-mentioned floating type slider is taken on the disc surface side, a stable floating state cannot be obtained when the magnetic head is loaded with respect to the disc surface of the magnetooptical recording medium, thus causing damage to the disc surface (recording film) and the sliding surface of the floating type slider.

Therefore, in a magnetooptical disc apparatus having versatility for magnetooptical recording media of different modulation methods, when information is recorded/reproduced on/from a non-magnetic field modulation type magnetooptical recording medium, the magnetic head must be used by escaping it from a loading position with respect to the disc surface, as follows. As a conventional escaping mechanism for the magnetic head using the floating type slider, a mechanism employed in a magnetic field modulation type magnetooptical disc apparatus shown in FIGS. 1 to 3 is known.

In the magnetooptical disc apparatus shown in FIGS. 1 to 3, seek operations of both an optical head (optical pickup device) 103 and a magnetic head 104 carried on a carriage 102 are simultaneously performed by a seek motor (driving device) 101. The magnetic head 104 is attached to a floating type slider, and the slider is attached to a magnetic head pop-up mechanism 105 via a support beam. The pop-up mechanism is operated by a magnetic head escaping mechanism (to be described later), so that the magnetic head can approach/go away with respect to a disc surface of a magnetooptical recording medium 108.

In the magnetic head pop-up mechanism 105, a pivot member 111 is supported to be pivotal about a support shaft 112 as a pivot shaft arranged on the carriage 102, and the support beam is attached to the pivot member 111. In addition, an engaging contact portion 106 is arranged, and is biased downward by a pressing biasing member 107 to pivot the pivot member 111. As a result, the magnetic head 104 can be escaped or moved away from the disc surface. The vertical movement of the pressing biasing member 107 is controlled by a driving means such as a solenoid mechanism. A disc type detection sensor 115 and a disc cassette load/writing inhibition detection sensor 116 are arranged on a chassis of the magnetic disc apparatus, and are used in magnetic head escaping control to be described below.

More specifically, in a non-loading state of a disc cassette, no output signals are generated from the sensors 115 and 116. In this state, the driving means is inactive, and the pressing biasing member 107 is held at its lower position to press the engaging contact portion 106, and the magnetic head 104 is escaped above the disc surface, as shown in FIG. 1.

When a disc cassette is loaded, the sensor 116 detects it, and the sensor 115 detects a disc type detection portion 1100 (FIG. 4) provided on a disc cassette 110. The detection results are supplied to a control circuit. If the control circuit determines that a magnetic field modulation type overwrite-capable disc is loaded, it supplies a command signal to a driving circuit to enable the driving means. Thus, as shown in FIG. 2, the pressing biasing member 107 is moved upward, and is disengaged from the engaging contact portion 106. In this case, the pivot member 111 is pivoted about the support shaft 112 since it is biased by a spring (not shown) in a load direction of the magnetic head in the carriage 102. A locking member 109 for defining the load position of the magnetic head is arranged on the pivot member 111. When the locking member 109 is brought into contact with a locking portion 113 provided on the carriage 102 upon pivotal movement of the pivot member 111, the pivotal movement of the pivot member 111 is stopped at that position, and loading of the magnetic head 104 is completed. The magnetooptical recording medium 108 stored in the disc cassette 110 is rotated and scanned by a spindle motor 120, and is subjected to recording/reproduction upon radiation of a laser spot by the optical head 103 and application of a magnetic field by the magnetic head 104.

When the control circuit determines from the detection results of the sensors 116 and 115 that the loaded magnetooptical recording medium is, e.g., a ROM disc or an optical modulation type magnetooptical recording medium, it does not output a command signal to the driving circuit. Therefore, since the pressing biasing member 107 is kept at its lower position, as shown in FIG. 3, the magnetic head 104 is held at an unload position.

However, the above-mentioned conventional escaping mechanism suffers from the following drawbacks when a magnetooptical disc apparatus, which adopts this mechanism, is arranged to have the above-mentioned versatility. More specifically, the escaping mechanism adopted in this apparatus is subjected to two-way control, i.e., is controlled in correspondence with an escaping (unload) position upon loading/unloading of a disc cassette and a load position of the magnetic head to the disc surface of a magnetooptical recording medium. For this reason, the escaping amount is large, and a large-size driving means (e.g., a solenoid mechanism) for the escaping mechanism must be used. In addition, when a non-magnetic field modulation type magnetooptical recording medium is loaded, a pressing member (e.g., the above-mentioned pressing biasing member 107) must be allowed to extend from the chassis over the entire seek range so as to seek the magnetic head which is kept separated from the disc surface, thus disturbing the mounting space.

SUMMARY OF THE INVENTION

The present invention has been made in consideration of the above situation, and has as its object to provide a magnetooptical disc apparatus, which can realize compact, simple structure of a an escaping means of an escaping mechanism, and has a two-way an escaping means which can assure a load position of a magnetic head for a non-magnetic field modulation type recording medium (i.e., an unload position of the magnetic head for a magnetic field modulation type recording medium) in addition to the load position of the magnetic head for the magnetic field modulation type recording medium.

In order to achieve the above object, according to the present invention, there is provided a magnetooptical disc apparatus, in which a beam spot is formed by radiating a laser beam from an optical pickup device onto a disc-shaped magnetooptical recording medium, and a bias magnetic field is applied from a magnetic head, which is thread-moved integrally with the optical pickup device in a track direction of the magnetooptical recording medium, in correspondence with at least a small area of the beam spot, so as to read/write a magnetooptical signal, comprising a floating type slider, which carries the magnetic head, first escaping means for controlling the magnetic head to a load/unload position with respect to the magnetooptical recording medium together with the slider, and second escaping means for controlling the magnetic head to a load/unload position with respect to a disc cassette which stores the magnetooptical recording medium, wherein the second escaping means is controlled in association with a loading operation of the disc cassette.

In this case, it is preferable that the optical pickup device is carried on a driving device for realizing the above-mentioned thread movement, the magnetic head is supported on the driving device together with the slider to be pivotal in a direction to approach/go away with respect to a disc surface of the magnetooptical recording medium, and the pivot position of the magnetic head is defined by the first and second escaping means. More specifically, in order to achieve a loading state with respect to the disc surface when the magnetic head is used as a magnetic field modulation type bias magnetic field generation device, and to achieve an unloading state with respect to the disc surface when the magnetic head is used for applying a bias field of another type, the first escaping means may be constructed to use a piezoelectric element having a bimorph structure as part of its arrangement, or may comprise a stacked piezoelectric element and a displacement enlarging mechanism as part of its constitution so as to define the escape position by controlling a current of the piezoelectric element, or may be constructed to use an elastic member as part of its constitution so as to define the pivot position by engaging or disengaging the elastic member.

DETAILED DESCRIPTION OF THE PREFERRED EMBODIMENTS

Figure 1:
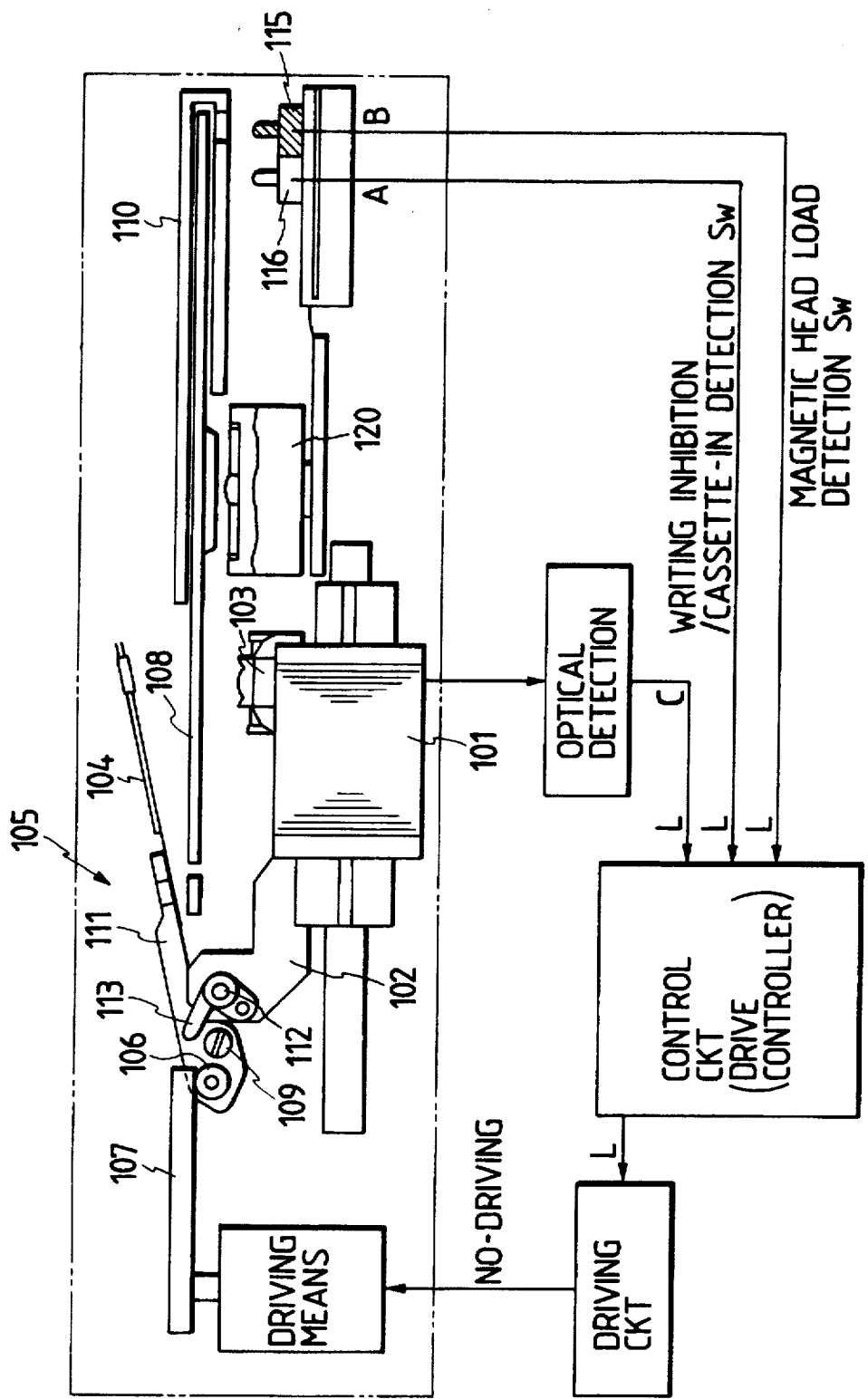
FIG. 1 is a side view of a non-loading state of a disc cassette in the prior art.
Figure 2:
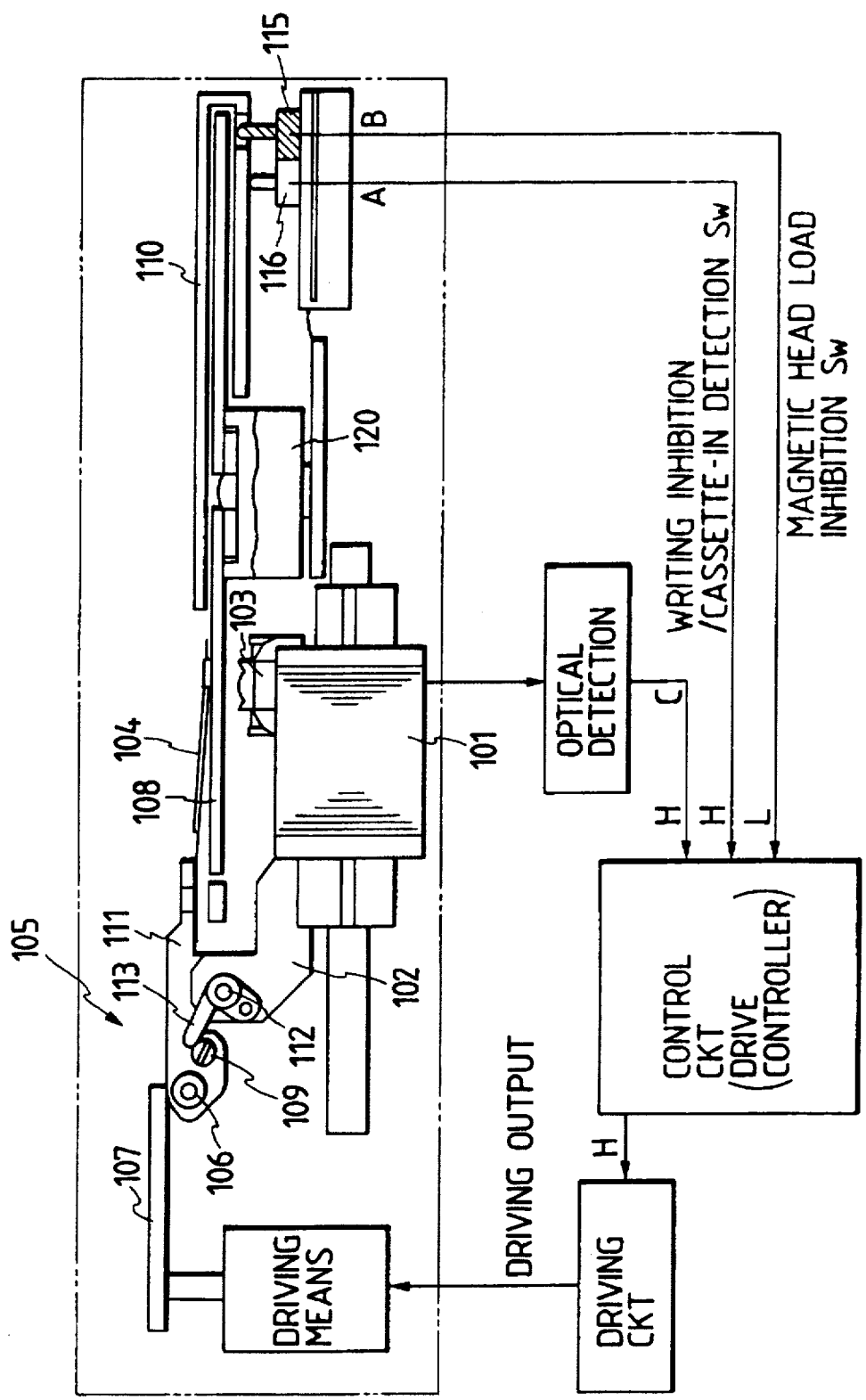
FIG. 2 is a side view of a loading state of a magnetic modulation type disc in the prior art.
Figure 3:
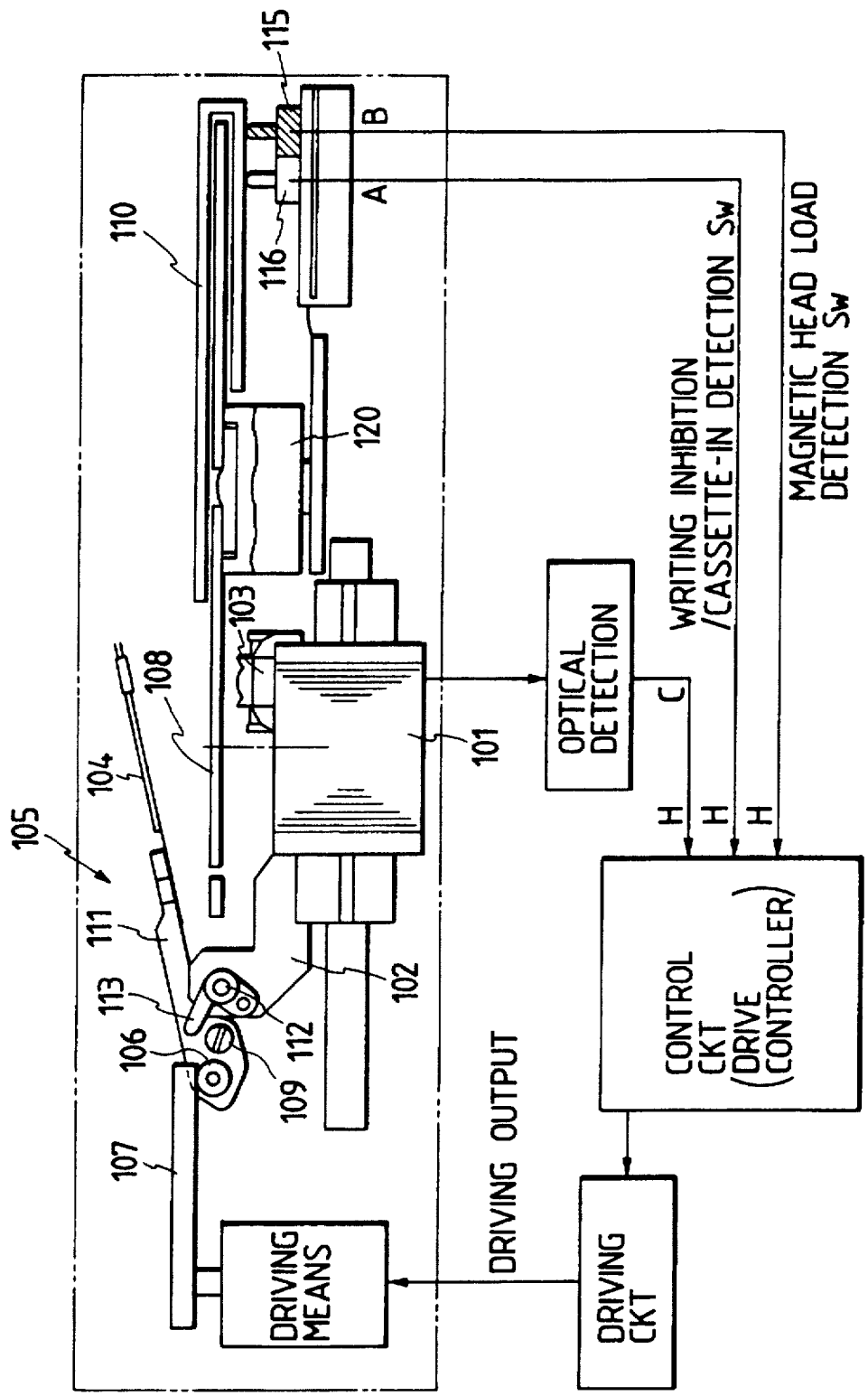
FIG. 3 is a side view of a loading state of a non-magnetic modulation type disc in the prior art.
Figure 4:
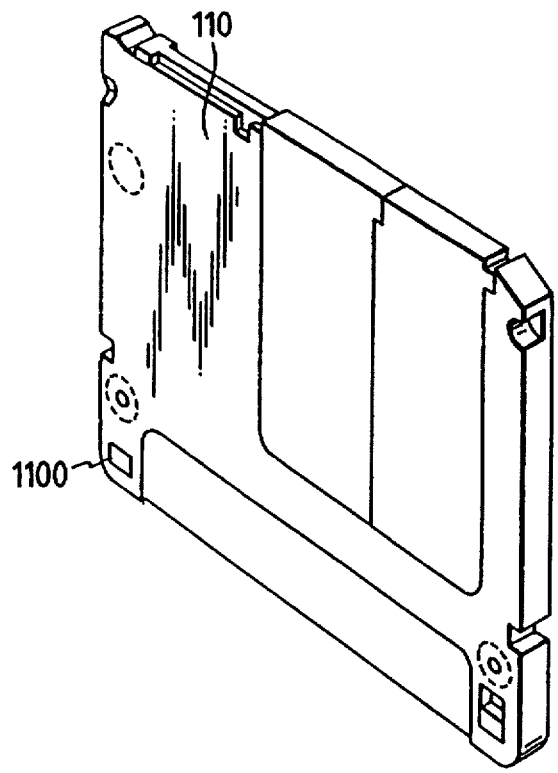
FIG. 4 is a perspective view of a conventional disc cassette.
Figure 6:
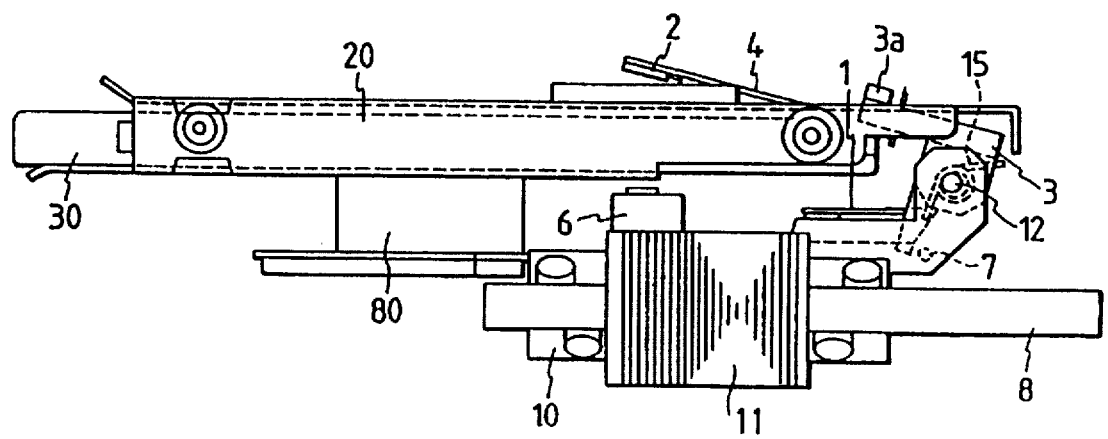
FIG. 6 is a side view of the apparatus shown in FIG. 5.
Figure 5:
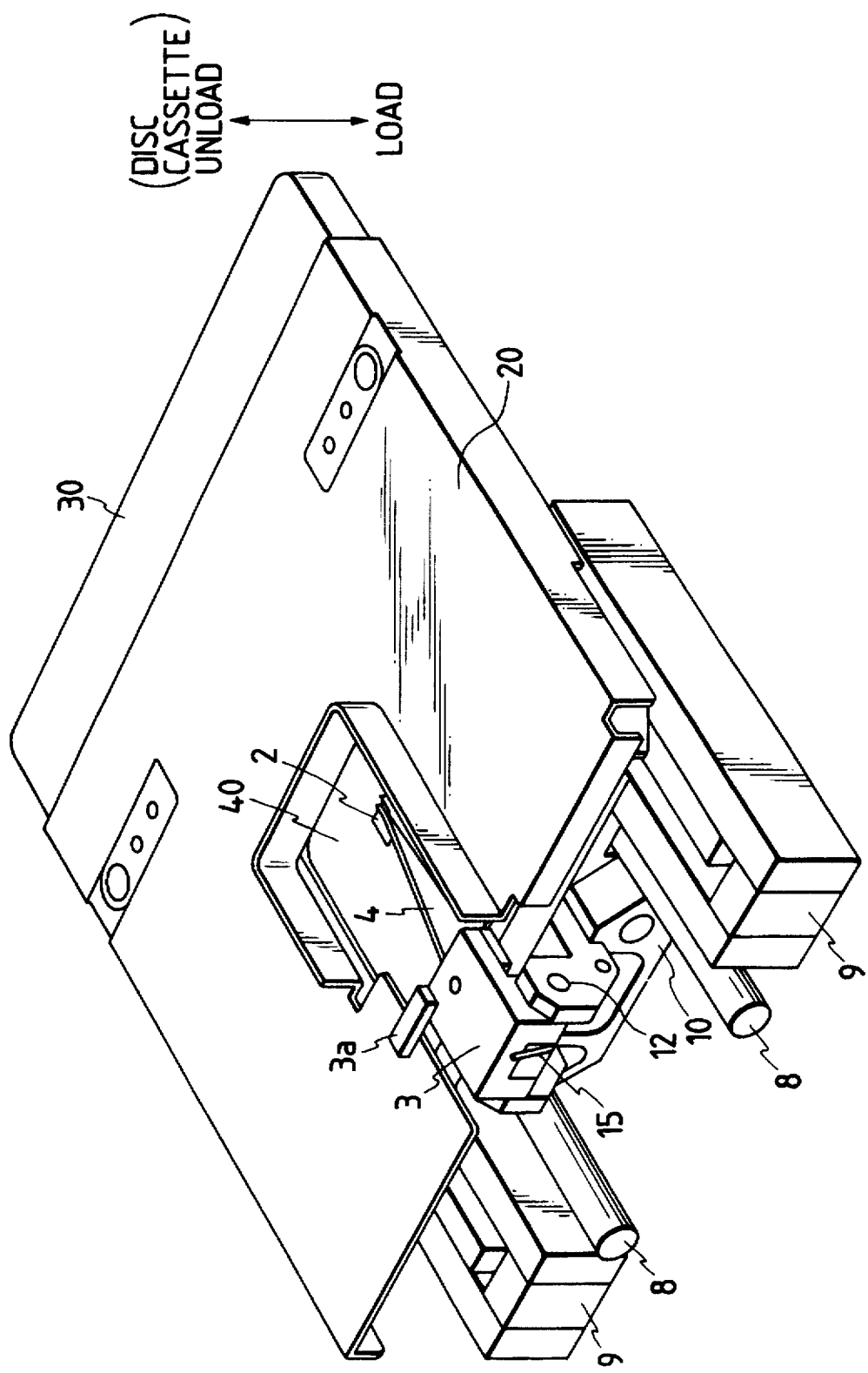
FIG. 5 is a perspective view showing a magnetooptical disc apparatus according to the present invention.

The preferred embodiments of the present invention will be described in detail hereinafter with reference to FIGS. 5 to 8B. The embodiments to be described hereinafter adopt substantially the same arrangement as in the above-mentioned prior art, except for an escaping mechanism. More specifically, in a magnetooptical disc apparatus shown in FIGS. 5 to 8B, seek operations of both an optical head (optical pickup device for radiating a recording/reproduction beam onto a magnetooptical recording medium 40) 6 and a magnetic head 2 carried on a carriage 10 are simultaneously performed by a seek motor (driving device). The seek motor is constituted by a linear motor coil 11 provided on the carriage 10, and a magnetic circuit 9 including a magnet arranged along a guide 8 for guiding the carriage 10. The magnetic head 2 is attached to a floating slider, and the slider is attached to a pivot member 3 via a support beam 4. The pivot member 3 is axially supported on the carriage 10 by a support shaft 12, and is elastically supported by a torsion spring 15 in a direction in which the magnetic head 2 approaches or goes away from the disc surface of the magnetooptical recording medium 40.

In particular, the present invention comprises a first escaping means for controlling the magnetic head 2 as a magnetic modulation type bias magnetic field generation device together with the slider to a load/unload position with respect to the magnetooptical recording medium 40, and a second escaping means for controlling the magnetic head 2 to a load/unload position with respect to a disc cassette 30, which stores the magnetooptical recording medium 40.

The second escaping means is controlled in association with the loading operation of the disc cassette 30. In this embodiment, when the disc cassette 30 is not loaded, a cassette holder 20 is directly or indirectly engaged with or disengaged from a portion of the pivot member 3 so as to hold the magnetic head 2 at a position shown in FIG. 6. More specifically, an engaging piece 3a is attached to the pivot member 3. In the above-mentioned non-loading state (the cassette holder 20 is located at a position higher than that in a loading state), the engaging piece 3a is engaged with the edge of a shutter opening portion of the cassette holder 20, and escapes the pivot member 3 to the unload position against the biasing force of the torsion spring 15. In the loading state, the engaging piece 3a is disengaged, and as a result, the pivot member 3 can access the load position by the biasing force of the torsion spring 15. In this case, a stopper 7 for limiting the deformation amount (pressing amount) is arranged on the carriage 10 so that the magnetic head 2 can compress the magnetooptical recording medium 40 by a predetermined compression amount via the support beam 4. An arm extending downward from the pivot member 3 can abut against the stopper 7. In this embodiment, the engaging piece 3a is directly engaged with the cassette holder 20. However, in order to assure a required escaping amount, a displacement enlarging or reduction mechanism may be arranged at an intermediate position, as a matter of course.

Figure 7A:
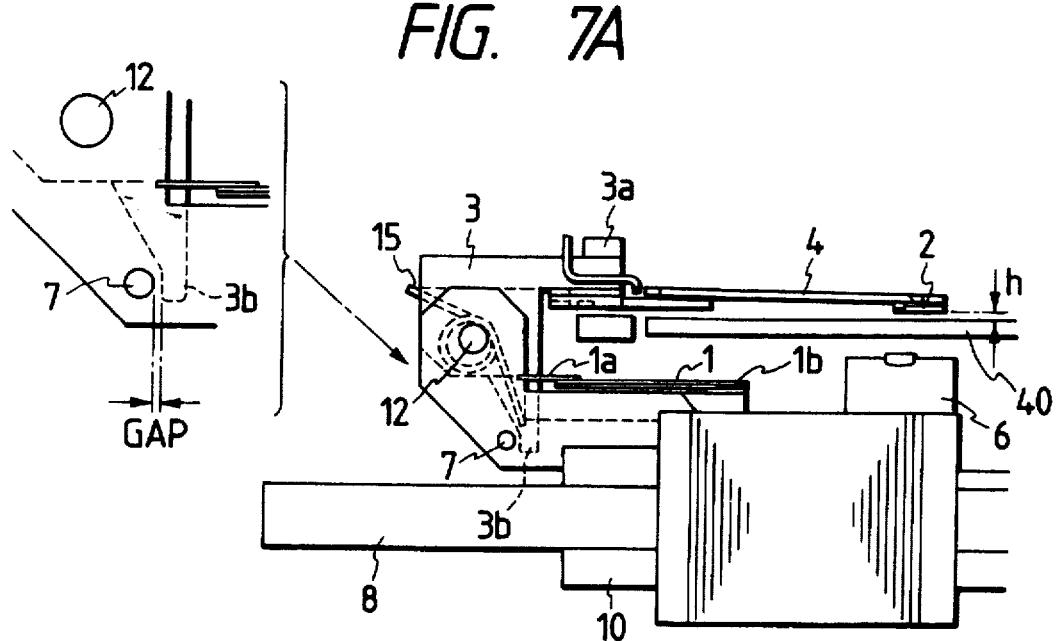
FIGS. 7A, 7B, and 7C are side views respectively showing a loading state of a magnetic modulation type disc, a loading state of a non-magnetic modulation type disc, and a modification of a first escaping means.
Figure 7B:
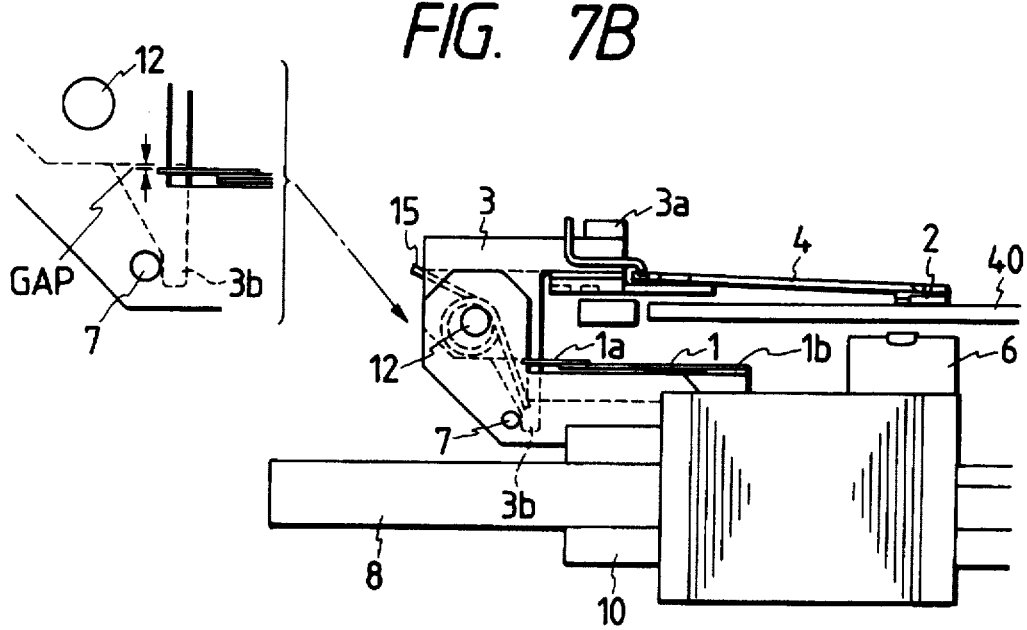
Figure 7C:
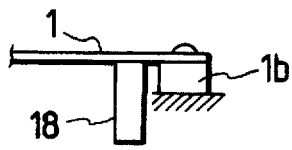

The first escaping means is arranged to use a piezoelectric element having a bimorph structure as part of its constitution, and defines the pivot position of the pivot member 3 by controlling a current of the piezoelectric element, so that a load state with respect to the disc surface is attained when the magnetic head 2 is used as a magnetic modulation type bias magnetic field generation device, and an unload state with respect to the disc surface is attached when the magnetic head 2 is used for applying another type of bias magnetic field. In this embodiment, as shown in FIGS. 7A to 7C, a flat piezoelectric element 1 having a bimorph structure is horizontally arranged on the carriage 10, so that its base end is supported by the carriage 10 via an electrical insulating member 1b. An electrical insulating member 1a is attached to the free end of the piezoelectric element 1, thereby supporting the pivot member 3 counterclockwise, as shown in FIG. 7A.

As a result of detection by the same means (not shown) as the detection sensors described in the prior art, when a control circuit (not shown) determines that the loaded magnetooptical recording medium is of magnetic field modulation type, the control circuit (not shown) energizes the piezoelectric element 1 to deform it. (In this case, the deformation means a change in shape from a shape wherein when the piezoelectric element 1 is not energized, the electrical insulating member 1a contacts the lower surface of the pivot member 3, and supports the pivot member 3 counterclockwise, so that the magnetic head 2 is located at a position of a height h from the medium surface, to a shape wherein when the piezoelectric element is energized, the electrical insulating member 1a is separated from the pivot member 3, so that an arm portion 3b of the pivot member 3 abuts against the stopper 7.) When the piezoelectric element 1 is deformed, a state shown in FIG. 7A is changed to a state shown in FIG. 7B, and the pivot member 3 is allowed to pivot clockwise until the arm portion 3b abuts against the stopper 7. However, when the control circuit determines that the loaded magnetooptical medium is of a type other than the magnetic field modulation type, the piezoelectric element 1 is not energized, and the pivot member 3 is kept supported by the piezoelectric element 1, so that a gap remains between the arm portion 3b and the stopper 7, as shown in FIG. 7A.

In this manner, when the loaded magnetooptical recording medium is of magnetic field modulation type, the magnetic head 2 is accessed to a state (load state) approaching the disc surface within a range considering the surface vibration of the disc. However, when the loaded magnetooptical medium is of a type other than the magnetic field modulation type, the magnetic head 2 is held in a state (unload state) escaped from the disc surface. The magnetic head 2 can also be used as a magnetic head in an optical modulation method.

In this embodiment, the first driving means adopts the piezoelectric element having the bimorph structure, but may adopt a self-deformable material in response to, e.g., an electrical signal (e.g., a shape memory alloy, a shape memory resin, a bi-metal, or the like). A driving means such as a stacked piezoelectric element having a small deformation amount is preferably used in combination with a proper stroke enlarging mechanism. In this construction, a structure shown in, e.g., FIG. 7C is available. In FIG. 7C, the piezoelectric element is denoted by reference numeral 18. The piezoelectric element 18 is arranged on the carriage 10, and is deformed in the direction of its thickness. In place of the piezoelectric element 1 of the embodiment described above, a leaf spring 1' is adopted as an enlarging mechanism, and is supported by the piezoelectric element 18. Therefore, the leaf spring 1' flexes upon self-deformation of the piezoelectric element 18, and serves as the first escaping means.

Figure 8A:
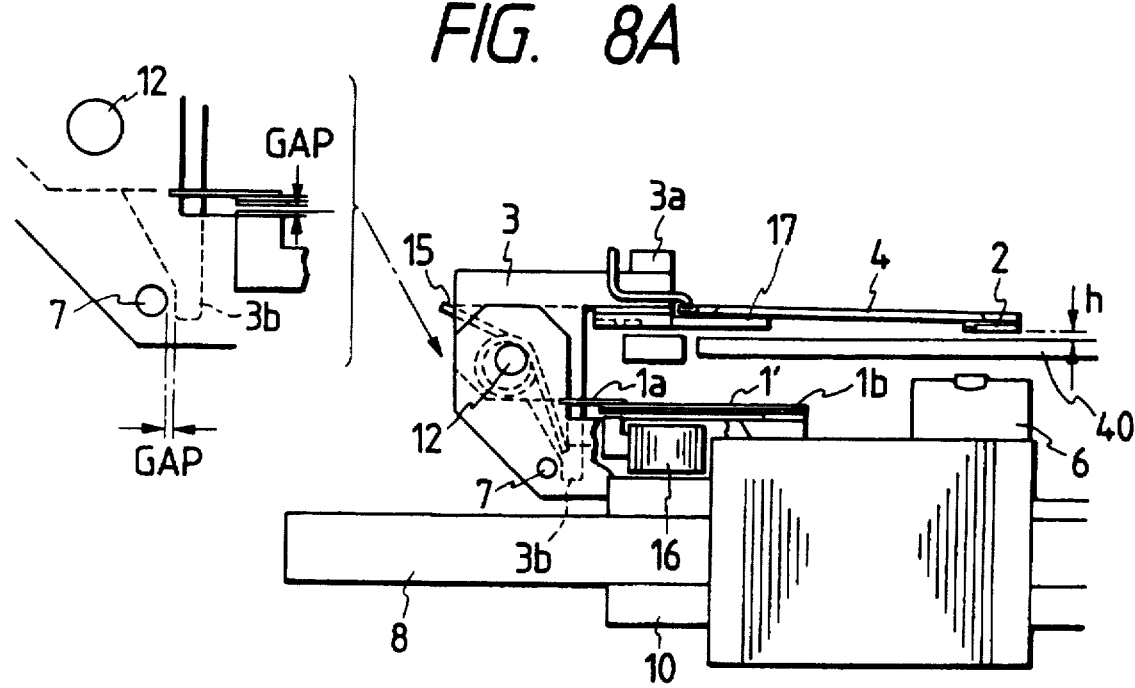
FIGS. 8A and 8B are side views showing another embodiment of the present invention.
Figure 8B:
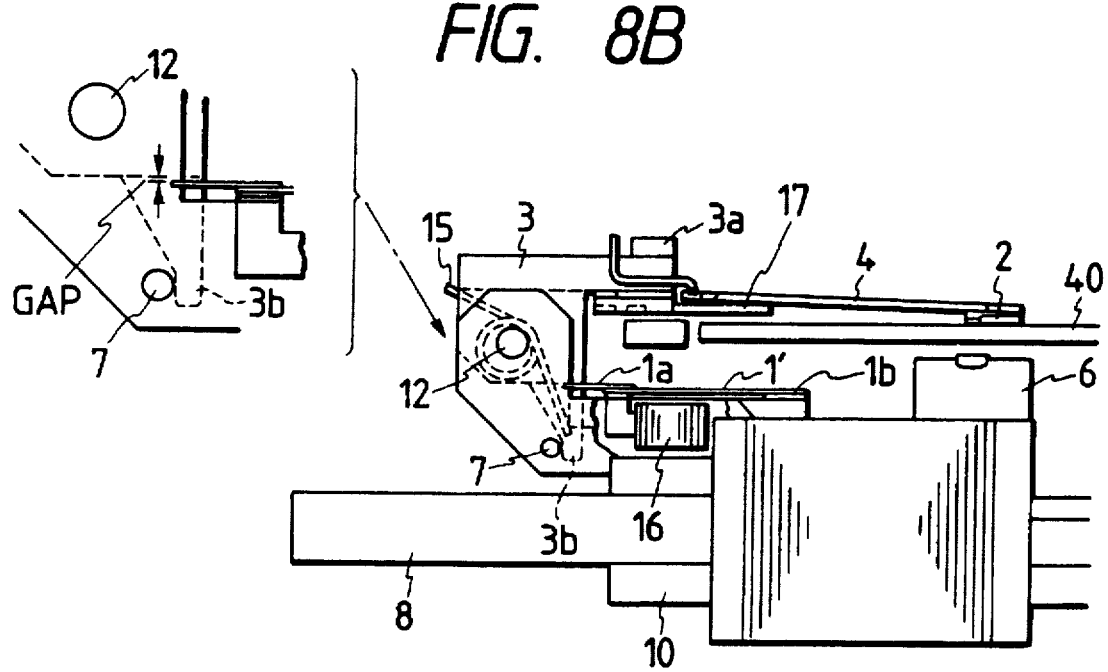

In another embodiment shown in FIGS. 8A and 8B, a leaf spring 1' consisting of a ferromagnetic member is arranged in place of the piezoelectric element, and is chucked and deformed by energizing a solenoid mechanism 16 arranged below the leaf spring 1'. Since other arrangements are the same as those in the above embodiment, a detailed description thereof will be omitted.

According to the present invention, as described above, the magnetic head is arranged on the floating type slider, the apparatus comprises a first escaping means for controlling the magnetic head as a magnetic modulation type bias magnetic field generation device together with the slider to a load/unload position with respect to the magnetooptical recording medium, and a second escaping means for controlling the magnetic head to a load/unload position with respect to the disc cassette, which stores the magnetooptical recording medium, and the second escaping means is controlled in association with the loading operation of the disc cassette. Therefore, the escaping means can have a compact, simple structure, and the load position of the magnetic head for a non-magnetic field modulation type recording medium (an unload position of the magnetic head for a magnetic field modulation type recording medium) can be assured in addition to the access position of the magnetic head for the magnetic field modulation type recording medium.

What is claimed is:

1. An information recording/reproducing apparatus for effecting recording of information on and/or reproduction of information from a recording medium by applying a magnetic field modulated according to information while irradiating a light beam to the recording medium by an optical pickup, said apparatus comprising:

a magnetic head for generating the magnetic field;

a floating type slider for supporting said magnetic head;

a holder for supporting the recording medium, said holder being movable up and down for unloading and loading the recording medium;

discriminating means for discriminating whether the recording medium is a magnetic field modulation type or a non-magnetic field modulation type of recording medium, and for producing a discrimination result;

first escaping means, comprising a driving source, for moving said magnetic head to a first escaping position in accordance with the discrimination result of said discriminating means;

second escaping means for engaging a portion of said holder for moving said magnetic head to a second escaping position, which is a further distance from the recording medium than the first escaping position, in association with the up and down movement of said holder; and a carriage on which said magnetic head, said floating slider, said first escaping means and said second escaping means are mounted.

2. An apparatus according to claim 1, wherein said driving source of said first escaping means comprises a piezoelectric element, and further comprising energizing means for selectively energizing said piezoelectric element to move said magnetic head from the recording medium.

3. An apparatus according to claim 2, wherein said energizing means adjusts an escape position of said magnetic head and said floating type slider by utilizing a change in shape of said piezoelectric element upon energization, to control movement of said magnetic head from the recording medium.

4. An apparatus according to claim 1, wherein said first escaping means comprises at least an elastic member, and further comprising means for adjusting a deformation state of said elastic member to control movement of said magnetic head from the recording medium.

5. An apparatus according to claim 1, wherein the optical pickup is mounted on said carriage.

6. An apparatus according to claim 5, wherein said floating type slider is pivotally supported on said carriage.

7. An apparatus according to claim 6, wherein said first escaping means comprises a piezoelectric element, and further comprising energizing means for selectively energizing said piezoelectric element to move said magnetic head from the recording medium.

8. An apparatus according to claim 7, wherein said energizing means adjusts a pivoting position of said floating type slider and said magnetic head by utilizing a change in shape of said piezoelectric element, to control movement of said magnetic head from the recording medium.

* * * * *

UNITED STATES PATENT AND TRADEMARK OFFICE
CERTIFICATE OF CORRECTION

PATENT NO. : 5,594,708
DATED : January 14, 1997
INVENTOR(S) : Masahiko CHAYA

It is certified that error appears in the above-indentified patent and that said Letters Patent is hereby corrected as shown below:

ON THE COVER PAGE

Under item [56] "References Cited"

FOREIGN PATENT DOCUMENTS:

"437413  3/1992  Japan" should read
--473413  3/1992  European Pat. Off.--.

COLUMN 1:

Line 31, "slider," should read --slider--; and
Line 32, "has" should read --have--.

UNITED STATES PATENT AND TRADEMARK OFFICE
CERTIFICATE OF CORRECTION

PATENT NO. : 5,594,708
DATED : January 14, 1997
INVENTOR(S) : Masahiko CHAYA

It is certified that error appears in the above-indentified patent and that said Letters Patent is hereby corrected as shown below:

<u>COLUMN 3</u>:

Line 11, "realize" should read --realize a--;
Line 12, "a" should be deleted; and
Line 13, "an" should be deleted.

Signed and Sealed this

Eighth Day of July, 1997

Attest:

BRUCE LEHMAN

Attesting Officer

Commissioner of Patents and Trademarks